(12) United States Patent
Hase

(10) Patent No.: US 7,802,242 B2
(45) Date of Patent: Sep. 21, 2010

(54) IMAGE PROCESSING APPARATUS USED IN NETWORK ENVIRONMENT

(75) Inventor: Junichi Hase, Osaka (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 1347 days.

(21) Appl. No.: 11/217,451

(22) Filed: Sep. 2, 2005

(65) Prior Publication Data
US 2006/0277279 A1 Dec. 7, 2006

(30) Foreign Application Priority Data
Jun. 7, 2005 (JP) ............... 2005-166771

(51) Int. Cl.
G06F 9/44 (2006.01)
G06F 9/45 (2006.01)
(52) U.S. Cl. ............. 717/169; 717/127; 717/170; 717/171
(58) Field of Classification Search ............... None
See application file for complete search history.

(56) References Cited
U.S. PATENT DOCUMENTS
6,640,265 B1  10/2003  Kim
6,725,323 B2  4/2004  Katahira
6,990,659 B1 *  1/2006  Imai ............... 717/171
7,146,412 B2 *  12/2006  Turnbull ............ 709/220
2002/0188937 A1  12/2002  Webster et al.

FOREIGN PATENT DOCUMENTS
| JP | 5-233309 A | 9/1993 |
| JP | 2001-265599 A | 9/2001 |
| JP | 2002-175194 A | 6/2002 |
| JP | 2002-244832 A | 8/2002 |
| JP | 2002-366469 | 12/2002 |
| JP | 2004-355556 A | 12/2004 |

* cited by examiner

*Primary Examiner*—Chuck O Kendall
(74) *Attorney, Agent, or Firm*—Buchanan Ingersoll & Rooney PC

(57) ABSTRACT

At the power-on timing, a device search request is sent in broadcast transmission or multicast transmission from a server side device. Device search response data is transmitted from a client side device to the server side device. At the server side device receiving the device search response data, any client side device present on the network is detected. The server side device determines a client side device whose software can be updated based on the device search response data, and transmits the required software to the client side device to request update. The client side device receives the software from the server side device to update its own software.

16 Claims, 15 Drawing Sheets

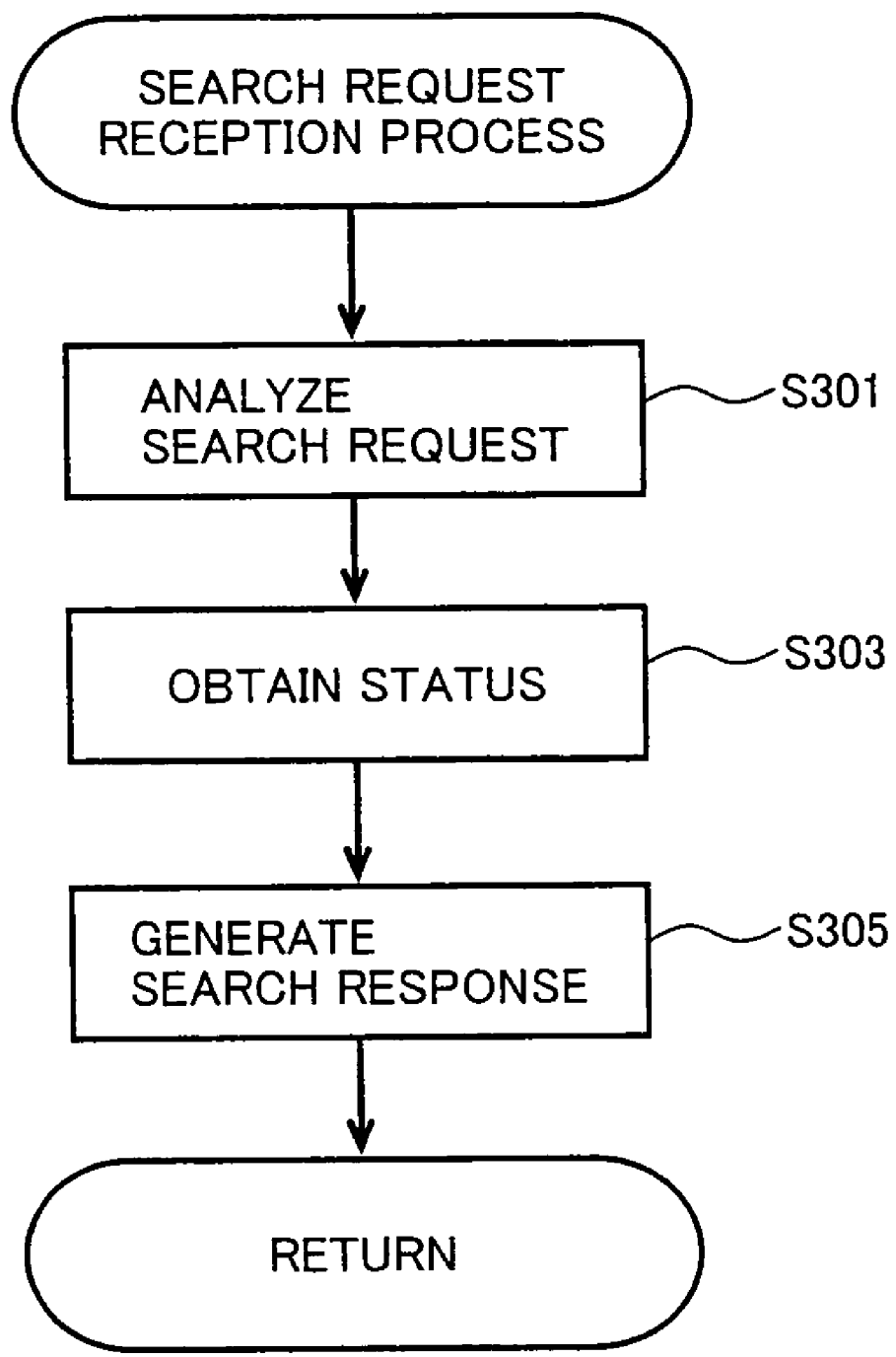

FIG.9

| ITEM | TYPE | CONTENTS |
|---|---|---|
| REQUEST/RESPONSE | NUMERIC | REQUEST:0<br>RESPONSE:1 |
| STATUS | NUMERIC | SUCCESS:0<br>FAILURE:1<br>UPDATE DISALLOWED:2<br>INQUIRY REQUIRED:3 |
| MODEL DESIGNATION | CHARACTER | FOR SEARCH REQUEST<br>NOT REQUIRED: 0/REQUIRED:1<br><br>FOR SEARCH RESPONSE<br>CHARACTER STRING |
| PRINTER | CHARACTER | |
| SCANNER | CHARACTER | |
| PANEL | CHARACTER | |
| CONTROLLER | CHARACTER | |
| FACSIMILE | CHARACTER | |
| INQUIRY DESTINATION | CHARACTER | |

FIG.10

| REQUEST/RESPONSE | NUMERIC | 0 |
|---|---|---|
| STATUS | NUMERIC | 0 |
| MODEL DESIGNATION | CHARACTER STRING | 1 |
| PRINTER | CHARACTER STRING | 1 |
| SCANNER | CHARACTER STRING | 1 |
| PANEL | CHARACTER STRING | 1 |
| CONTROLLER | CHARACTER STRING | 1 |
| FACSIMILE | CHARACTER STRING | 1 |
| INQUIRY DESTINATION | CHARACTER STRING | NOT SPECIFIED |

FIG.11

| REQUEST/RESPONSE | NUMERIC | 1 |
|---|---|---|
| STATUS | NUMERIC | 0 |
| MODEL DESIGNATION | CHARACTER STRING | CF2002+CN3101e |
| PRINTER | CHARACTER STRING | 1.10 |
| SCANNER | CHARACTER STRING | 1.10 |
| PANEL | CHARACTER STRING | 1.10 |
| CONTROLLER | CHARACTER STRING | 1.20 |
| FACSIMILE | CHARACTER STRING | 1.00 |
| INQUIRY DESTINATION | CHARACTER STRING | admin@printer.local |

FIG.13

```
From: $$$01$$
To: $$$02$$
THIS MAIL IS SOFTWARE UPDATE CONFIRMATION FROM $$03$$.
DEVICE DESIGNATION: $$04$$ IS ALLOWED OF SOFTWARE UPDATING
```

|  | FORMER VERSION NUMBER | NEW VERSION NUMBER |
|---|---|---|
| PRINTER | $$pr1$$ | $$pr2$$ |
| SCANNER | $$sc1$$ | $$sc2$$ |
| PANEL | $$pa1$$ | $$pa2$$ |
| CONTROLLER | $$co1$$ | $$co2$$ |
| FACSIMILE | $$fa1$$ | $$fa2$$ |

IN CASE OF UPDATING, PLEASE CONFIRM THROUGH PAGE SET FORTH BELOW.

http://c350-002.printer.local/$$05$$/softwareupdate.html

THE EXPIRATION DATE OF THIS PAGE IS $$06$$. (AFTER THIS DATE, UPDATE IS CEASED AND PAGE CANNOT BE OPENED)

FIG.14

From: c350-002@printer.local
To: admin@printer.local
THIS MAIL IS SOFTWARE UPDATE CONFIRMATION FROM c350-002.
DEVICE DESIGNATION: c350-003 IS ALLOWED OF SOFTWARE UPDATING

|  | FORMER VERSION NUMBER | NEW VERSION NUMBER |
|---|---|---|
| PRINTER | 1.00 | 1.10 |
| SCANNER | 1.00 | 1.10 |
| PANEL | 1.00 | 1.10 |
| CONTROLLER | 1.00 | 1.20 |
| FACSIMILE | 1.00 | NOT AVAILABLE |

IN CASE OF UPDATING, PLEASE CONFIRM THROUGH PAGE SET FORTH BELOW.

http://c350-002.printer.local/2c80cb3ab0D80c07/softwareupdate.html

THE EXPIRATION DATE OF THIS PAGE IS 2005/03/10 13:15 (JST). (AFTER THIS DATE, UPDATE IS CEASED AND PAGE CANNOT BE OPENED)

IMAGE PROCESSING APPARATUS USED IN NETWORK ENVIRONMENT

This application is based on Japanese Patent Application No. 2005-166771 filed with the Japan Patent Office on Jun. 7, 2005, the entire content of which is hereby incorporated by reference.

BACKGROUND OF THE INVENTION

1. Field of the Invention

The present invention relates to an image processing apparatus and a software updating method in an image processing apparatus. Particularly, the present invention relates to an image processing apparatus that updates software of an apparatus present on a network environment, and a software updating method in an image processing apparatus.

2. Description of the Related Art

Various software installed in image processing apparatuses such as MFPs (Multi Function Peripherals), copy machines, and printers conventionally have been updated mainly through manual means such as a system administrator, a service personnel, a service center connected to the network, or the like.

Japanese Laid-Open Patent Publication No. 05-233309 proposes a terminal device software updating method of updating software, as necessary, by obtaining revision information of installed software at an upper-level apparatus from a terminal device that is a lower-level apparatus.

This conventional updating method had the problem that there is a case where updating is not conducted properly due to insufficient or inaccurate administration through the manual means. It is to be particularly noted that image processing apparatuses such as the recent MFP are loaded with many individual software in accordance with their advance in the function and development of incorporating various software as components. Administration of which software in which image processing apparatus is to be updated as well as operation thereof is now placing further heavy burden.

The updating method proposed in the publication set forth above must have the software of a particular upper-level apparatus always set at the most recent revision for the upper level apparatus to update the software of a terminal device identified as the lower-level apparatus. This imposes a problem that the software of the entire network will not be updated to the latest one when the revision of the software of the upper level apparatus is not the newest one.

In the updating method proposed in the publication set forth above, determination of whether updating is required or not is based on the revision information alone. Since conditions others than the revision information are not employed, there is a problem that determination of whether updating is required/allowed or not cannot be made flexibly under other conditions corresponding to the situation of each software.

SUMMARY OF THE INVENTION

In view of the foregoing, an object of the present invention is to provide an image processing apparatus having software updated automatically to the newest software as the entire network without the presence of manual means, and a software updating method in an image processing apparatus.

According to an aspect of the present invention, an image processing apparatus includes a software storage unit storing software, a search unit searching for another apparatus on a network, a response reception unit receiving a response to the search from the another apparatus searched by the search unit, a response analyzer unit analyzing the response to determine whether updating of software stored in the software storage unit of the another apparatus is required or not, and a software transmission unit reading out and transmitting software required to be updated based on determination from the software storage unit.

According to another aspect of the present invention, an image processing apparatus includes a software storage unit storing software, a software transmission unit reading out and transmitting software directed to updating software stored in another apparatus on a network from the software storage unit, a software reception unit receiving the software from the another apparatus, and a rewrite unit rewriting the software stored in the software storage unit with software received at the software reception unit.

According to a further aspect of the present invention, a software updating method of an image processing apparatus including a software storage unit storing software includes: a search step of searching for another apparatus on a network, a response reception step of receiving a response to the search from another apparatus searched at the search step, a response analyzing step of analyzing the response to determine whether updating of software stored in the software storage unit of the another apparatus is required or not, and a software transmission step of reading out and transmitting software required to be updated based on determination from the software storage unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a flow chart of a search request reception process of step S205.

FIG. 9 shows a specific example of a data configuration of device search data and device search response data transferred between the server side device and a client side device.

FIG. 10 shows a specific example of device search data.

FIG. 11 shows a specific example of device search response data.

FIG. 13 shows a specific example of mail data in a mail format.

FIG. 14 shows a specific example of mail data corresponding to transmitted mail.

DESCRIPTION OF THE PREFERRED EMBODIMENTS

Figure 1:
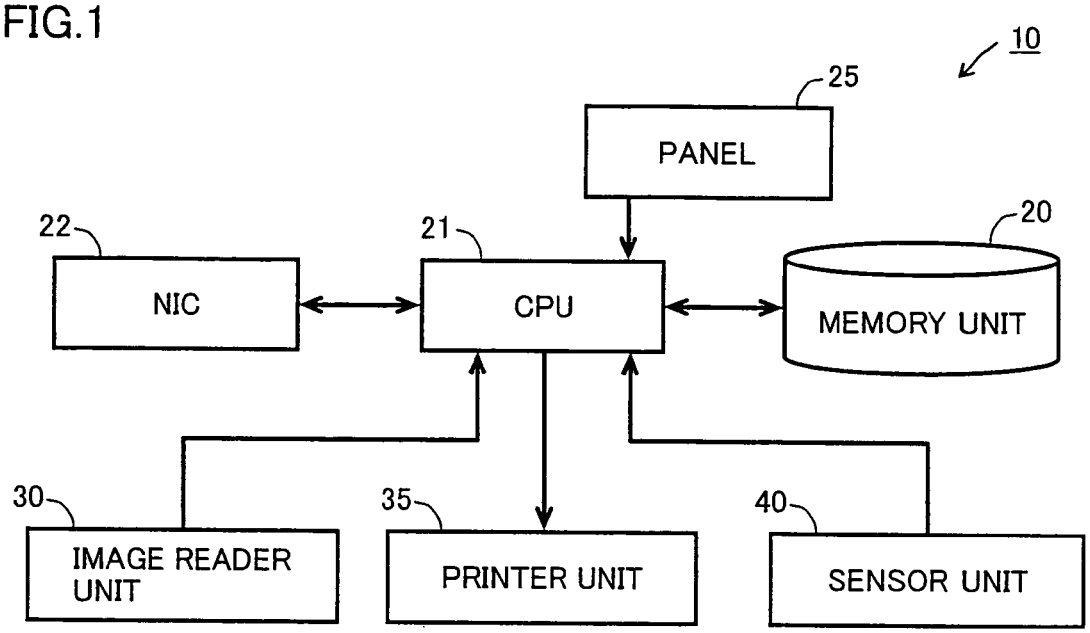
FIG. 1 is a block diagram showing a specific example of a hardware configuration of a device 10 identified as an MFP.

Embodiments of the present invention will be described hereinafter with reference to the drawings. In the following description, the same components and structural elements have the same reference characters allotted. Their designation and function are also identical. Therefore, detailed description thereof will not be repeated.

The system according to an embodiment of the present invention includes a plurality of devices 10, 11, 12, ... 1n, all connected to a network. Devices 10, 11, 12, ... 1n may include MFPs (Multi-Function Peripherals), and additionally personal computers and the like. The network includes a network through an exclusive line such as a LAN (Local Area Network), a network via a telephone line such as the Internet, a network via radio such as infrared communication, and the like.

Referring to FIG. 1, device 10 identified as an MFP includes a CPU (Central Processing Unit) for overall control, an image reader unit 30 reading out image data from a document, a printer unit 35 printing out an image on a paper sheet, an NIC (Network Interface Card) 22 inserted in an expansion slot not shown for connecting device 10 on a network or telephone line and/or establishing radio communication over a short range, a memory unit 20 formed of an HD (Hard Disk), a ROM (Read Only Memory), a RAM (Random Access Memory), a non-volatile memory, or the like to store job data and/or a program executed by CPU 21, a panel 25 identified as an interface with the user, and a sensor unit 40 detecting the remaining amount of consumable supplies and the like.

Figure 2:
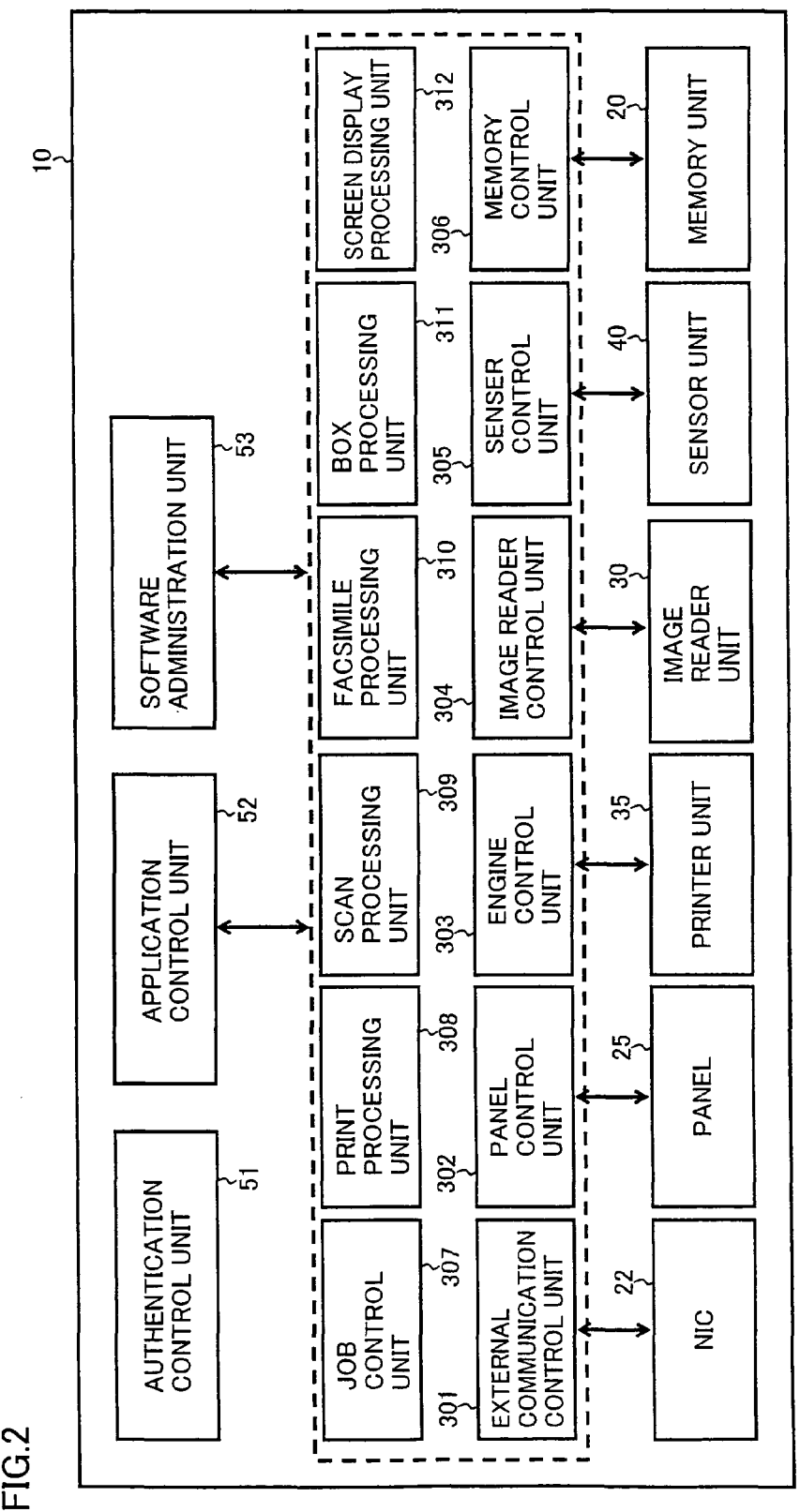
FIG. 2 is a block diagram showing a specific example of the facility configuration to conduct general image processing in device 10 identified as an MFP.

Each facility shown in FIG. 2 is implemented by CPU 21 of device 10 executing a program directed to image processing stored in memory unit 20.

Referring to FIG. 2, device 10 identified as an MFP includes an external communication control unit 301 to control communication with NIC 22, a panel control unit 302 to control information input/output at panel 25, an engine control unit 303 controlling the printer engine so as to control printing at printer unit 35, an image reader control unit 304 to control image readout at image reader unit 30, a sensor control unit 305 to control detection of the remaining amount and the like of consumable supplies at sensor unit 40, a memory control unit 306 to control information input/output with respect to the hard disk, non-volatile memory, RAM, and the like in memory unit 20, a job control unit 307 to control the job that is the subject of image processing, a print processing unit 308 to execute printing by execution of an application (software) for printing, a scan processing unit 309 to execute scanning by execution of an application directed to scanning, a facsimile processing unit 310 to execute facsimile transmission by execution of an application directed to facsimile transmitting, a box processing unit 311 executing processing with box function by execution of an application directed to the function called box function, a screen display processing unit 312 to execute screen display by execution of an application directed to image display at panel 25, an authentication control unit 51 to control user authentication, an application control unit 52 to control execution of an application at each of processing units 308-312, and a software administration unit 53 administering software by identifying revision information and the like that are associated with the version (revision) of software corresponding to such applications.

Figure 3:
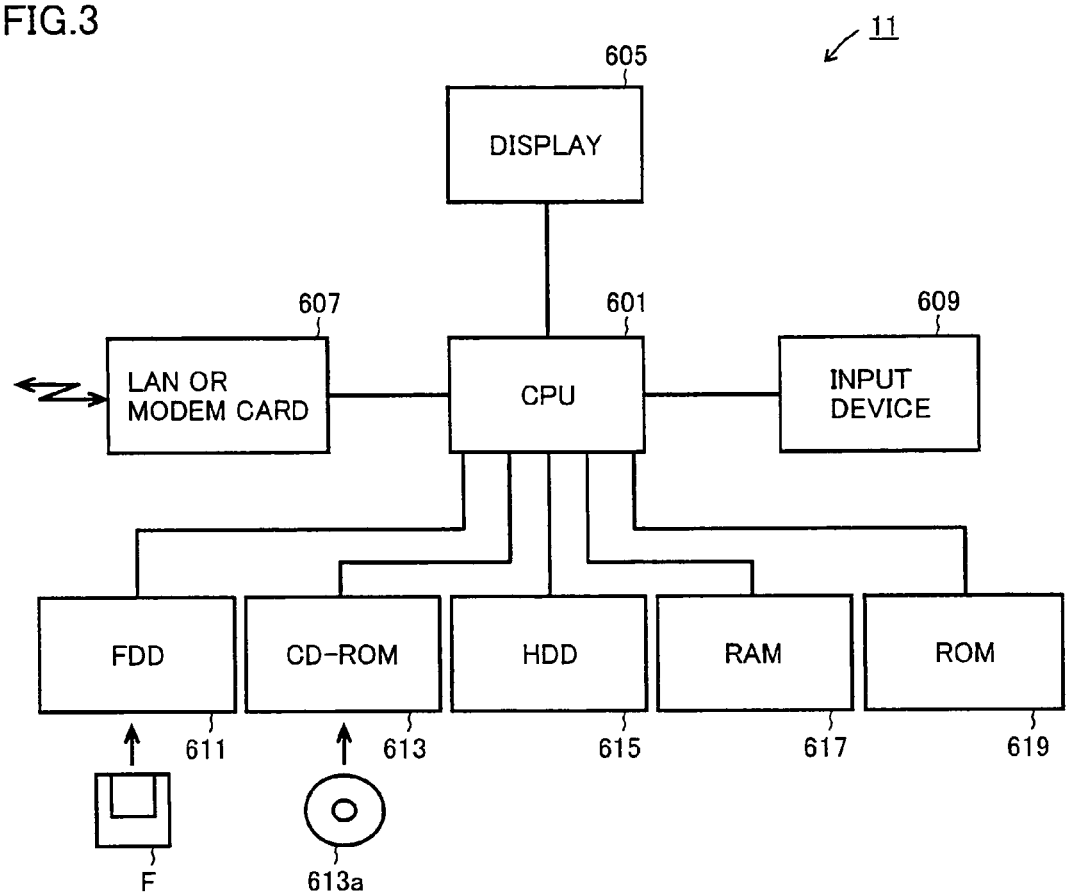
FIG. 3 is a block diagram showing a specific example of a hardware configuration of device 11 identified as a personal computer.

Referring to FIG. 3, device 11 identified as a personal computer includes a CPU 601 for overall control, a display 605, a LAN card (or modem card) 607 for connection with a network or for communication with an external source, an input device 609 formed of a keyboard, mouse, and the like, a flexible disk drive (FDD) 611, a compact disk-read only memory (CD-ROM) driver 613, a hard disk drive (HDD), a RAM 617, and a ROM 619.

Data such as a program recorded in a flexible disk F can be read out by flexible disk drive 611. Data such as a program stored in a CD-ROM 613a can be read out by CD-ROM drive 613.

The facility configuration to conduct general information processing at device 11 identified as a personal computer is substantially similar to that of FIG. 2. At the personal computer, the facility (such as the printer) unique to the MFP in the facility configuration of FIG. 2 is replaced with the facility executing a process to exhibit the function set forth above for the MFP.

Figure 4:
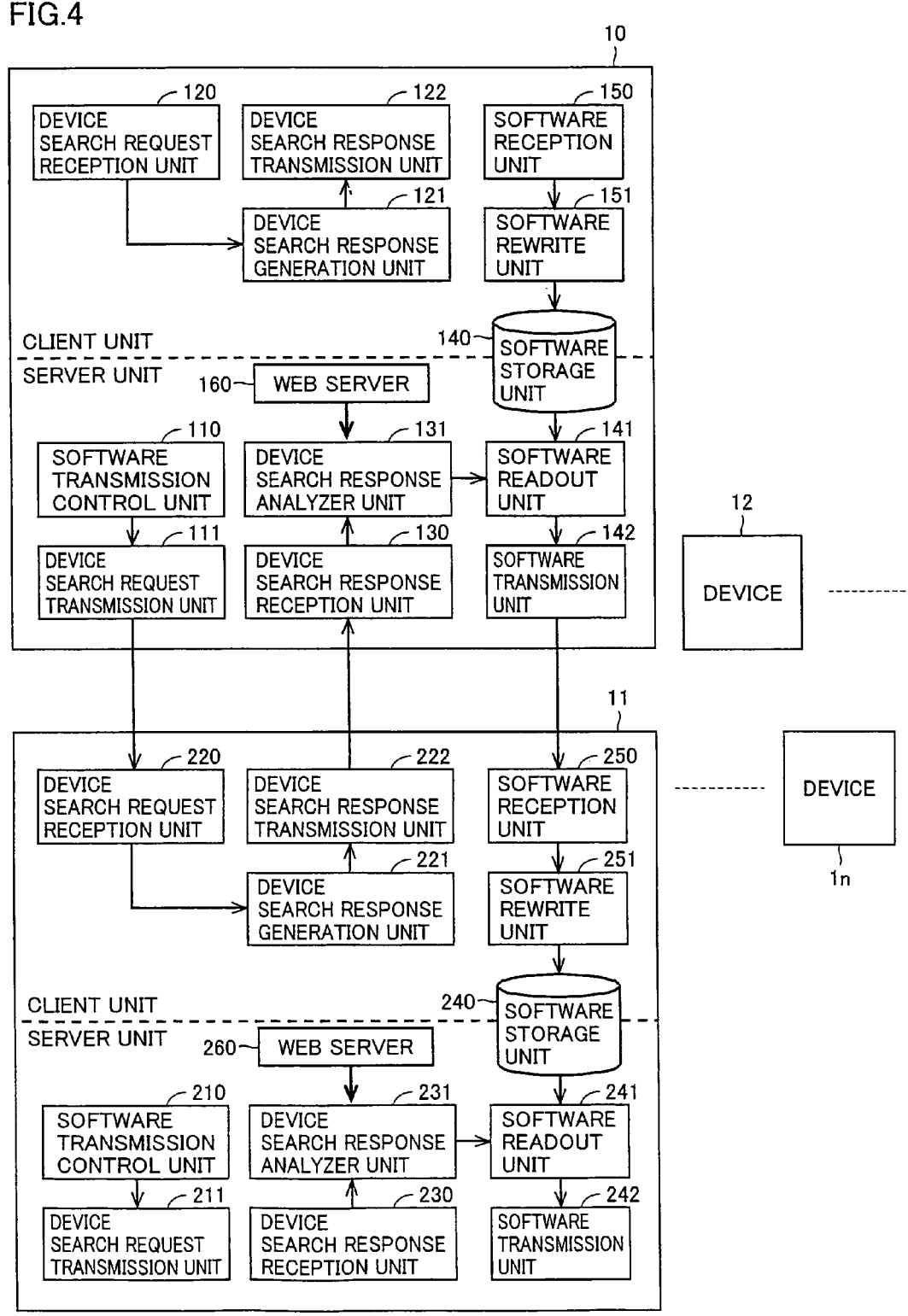
FIG. 4 is a block diagram showing a specific example of a facility configuration of devices 10 and 11 for software administration on a network.

Respective facilities shown in FIG. 4 are implemented by CPU 21 of device 10 executing the program directed to software administration stored in memory unit 20, and by CPU 601 of device 11 executing the program directed to software administration stored in a memory unit such as ROM 619.

Referring to FIG. 4, each device includes a server unit identified as a server facility, and a client unit identified as a client facility. Each device includes at least the client facility, and may include only the client facility in the case where the memory capacity and the like is restricted in the device.

Device 10 includes a software transmission control unit 110, a device search request transmission unit 111, a device search response reception unit 130, a device search response analyzer unit 131, a software readout unit 141, and a software transmission unit 142 at the server unit, as well as a device search request reception unit 120, a device search response generation unit 121, a device search response transmission unit 122, a software reception unit 150, a software rewrite unit 151, and a WEB server 160, if necessary, identified as a WEB page on the incorporated WEB server at the client unit. Device 10 also includes a software storage unit 140 at a region common to the server unit and the client unit.

When device 10 exhibits the server facility, software transmission control unit 110 requests device search request transmission unit 111 to transmit a device search request at the time of starting device 10 and/or at a predetermined elapse of time.

Device search request transmission unit 111 responds to a request from software transmission control unit 110 to transmit device search data that is data for device search on the network. The device search data can be sent in broadcast transmission or multicast transmission onto the network, or transmitted to one or more devices exhibiting a client facility (hereinafter, referred to as client side device) specified through the panel.

When device 10 exhibits the client facility, device search request reception unit 120 receives data for device search from the device exhibiting the server facility (hereinafter, referred to as server side device) to request device search response generation unit 121 to generate a device search response.

Device search response generation unit 121 responds to a request from device search request reception unit 120 to obtain information related to device 10 to generate device search response data that is data for device search response, and provides the generated device search response data to device search response transmission unit 121. Information related to device 10 includes information to identify device 10 (model designation, and the like), the current status, and information related to software, under administration of software administration unit 53 ("revision of activated software", "allowed/disallowed information of software update", "presence/absence information of update inquiry", "mail address of device administrator", and the like).

Device search response transmission unit 122 transmits the device search response data input from device search response generation unit 121 to the server side device.

When device 10 exhibits the server facility, device search response reception unit 130 receives device search response data from the client side device and applies the device search response data to device search response analyzer unit 131 to request analysis.

Device search response analyzer unit 131 responds to a request from device search response reception unit 130 to analyze the input device search response data and determines whether updating of the software at the client side device is allowed or not. When determination is made that software updating is allowed at the client side device as a result of analyzing the device search response data by device search response analyzer unit 131, software readout unit 141 is requested to read out software that can be used at the client side device.

Software storage unit 140 stores software identified as an application execute at each of processing units 308-312. The stored software is administered by software administration unit 53. Software readout unit 141 responds to a request from device search response analyzer unit 131 to read out and apply to software transmission unit 142 the required software from software storage unit 140.

Software transmission unit 142 transmits the software applied from software readout unit 141 to the client side device through the network.

When device search response data is received from a plurality of client side devices on the network at device search response reception unit 130, device search response analyzer unit 131 determines whether software updating is allowed or not for all the client side devices on the network. Software updating can be conducted for all devices that have software updating allowed among the client side devices, or only for a selected client side device among the client side devices that have software updating allowed.

When device 10 exhibits the client facility, software reception unit 150 receives software from the server side device and applies the received software to software rewrite unit 151.

Software rewrite unit 151 uses the software applied from software reception unit 150 to rewrite the software for activation stored in software storage unit 140 for update. When determination is made whether software updating is allowed or not at device search response analyzer unit 131 based on "presence/absence information of update inquiry" and "mail address of device administrator", and update inquiry is required, an inquiry is made on software updating through mail and the like towards the administrator of the client device, such that software rewriting is executed by software rewrite unit 151 only when update is permitted.

In a similar manner, device 11 includes a software transmission control unit 210, a device search request transmission unit 211, a device search response reception unit 230, a device search reception analyzer unit 231, a software readout unit 241, and a software transmission unit 242 at the server unit, as well as a device search request reception unit 220, a device search response generation unit 221, a device search response transmission unit 222, a software reception unit 250, a software rewrite unit 251, and a WEB server 260, if necessary, identified as a WEB page on an incorporated WEB server at the client unit. Device 11 also includes a software storage unit 240 at a region common to the server unit and the client unit, and functions in a manner similar to those of respective elements in device 10 set forth above.

Namely, when device 10 exhibits the server facility whereas device 11 exhibits the client facility, the device search data transmitted from device search request transmission unit 111 of device 10 is received at device search request reception unit 220 of device 11, and the device search response data is transmitted from device search response transmission unit 222 to device 10.

The device search response data transmitted from device search response transmission unit 222 of device 11 is received at device search response reception unit 130 of device 10, and the required software is transmitted from software transmission unit 142 of device 10 to device 11.

The software transmitted from software transmission unit 142 of device 10 is received at software reception unit 250 of device 11, and the software of device 11 is rewritten to be updated by software rewrite unit 251.

Figure 5:
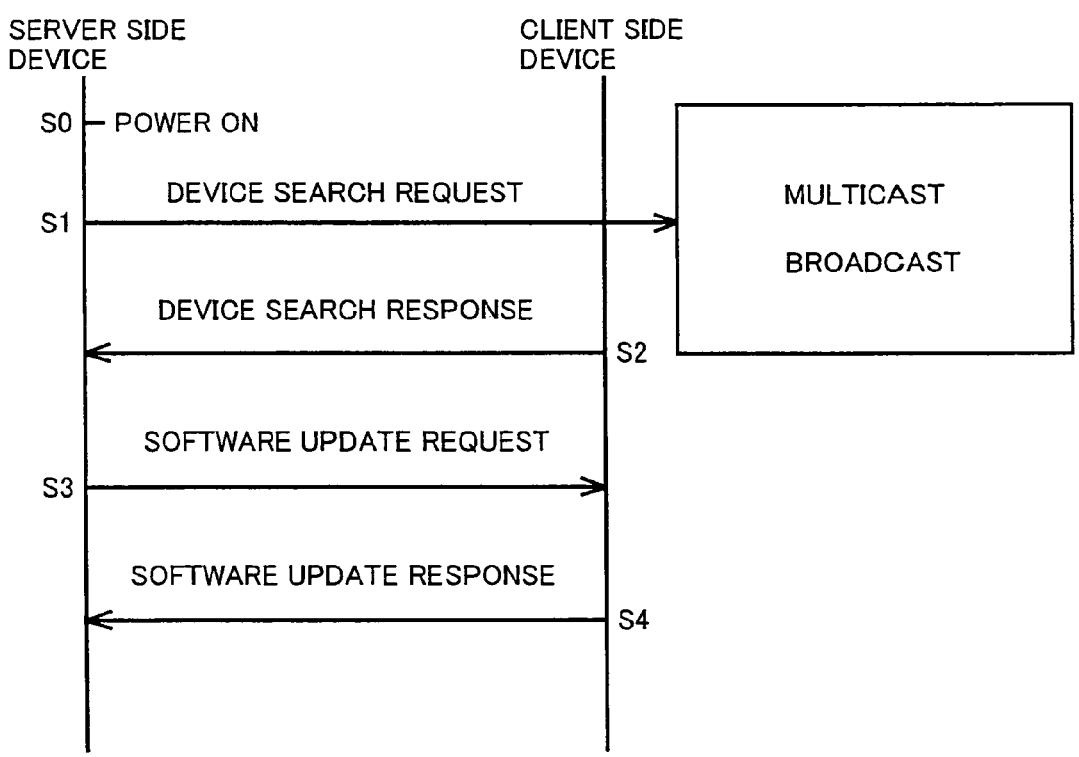
FIG. 5 represents a communication procedure between a server side device and a client side device.

In FIG. 5, the direction of communication data between the server side device and a client side device is represented in arrows.

Referring to FIG. 5, a device search request is transmitted in broadcast transmission or multicast transmission from the server side device at a predetermined timing (step S1). Here, the predetermined timing is the ON timing of power. The client side device responds to the device search request to transmit device search response data to the server side device (step S2). At the server side device receiving the device search response data, any client side device present on the network can be detected.

The server side device determines a client side device whose software is allowed to be updated based on the device search response data, and transmits the required software to that client side device for update (step S3). The client side device receives that software to update its own software, and then returns, as necessary, update completion with respect to the request (step S4).

Figure 6:
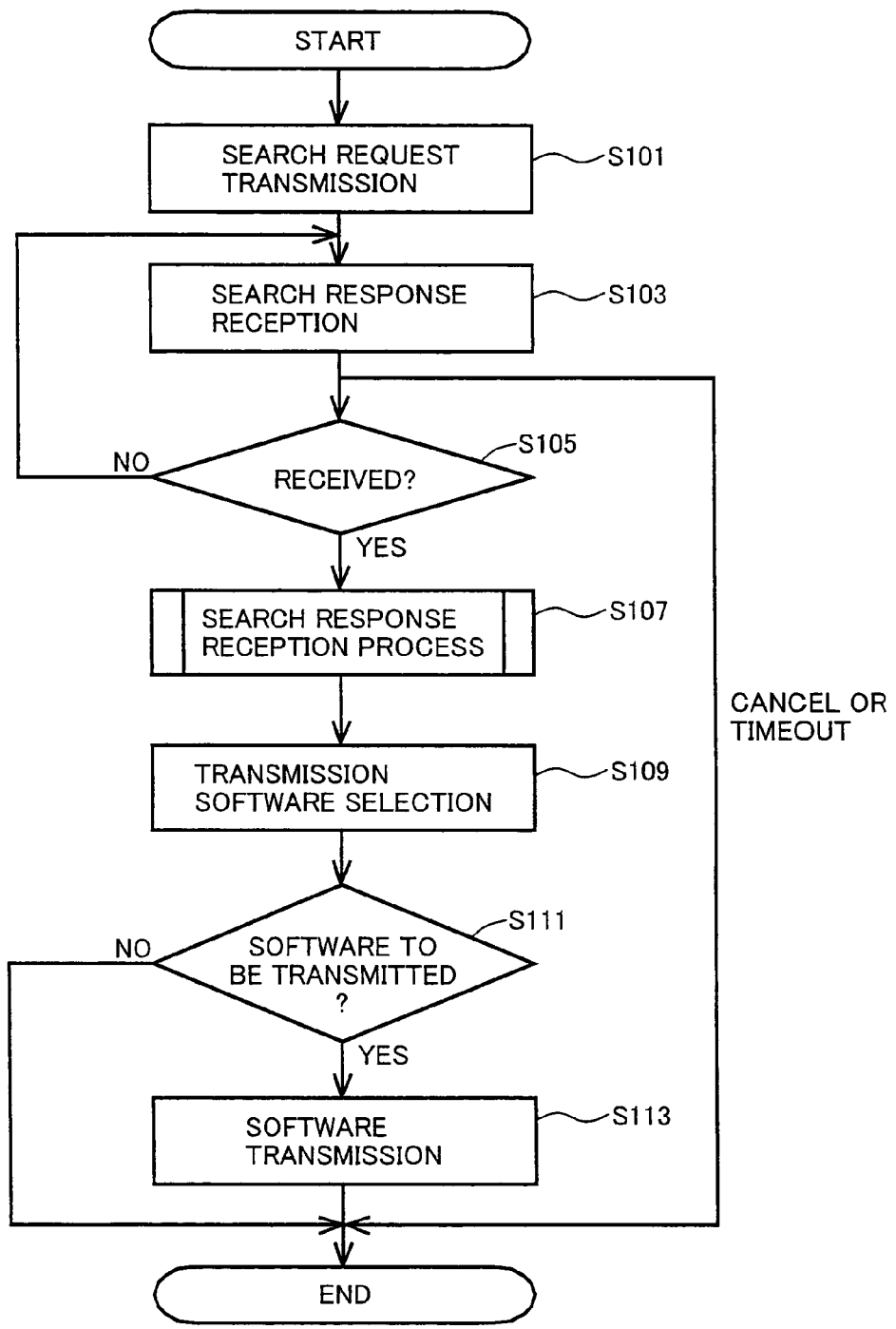
FIG. 6 is a flow chart of a software administration process at the server side device.

Assuming that device 10 identified as an MFP is the server side device, the process in the flow chart of FIG. 6 is implemented by CPU 21 of device 10 executing the software administration program stored in memory unit 20 to exhibit each facility shown in FIG. 4.

Referring to FIG. 6, when the power is turned ON and the server facility is initiated at device 10, device search request transmission unit 111 transmits a search request to a specific or non-specific device (client side device) on the network (step S101). Then, device 10 enters a receivable mode of device search response data from a client side device on the network at device search response reception unit 130 (step S103).

When device search response data is received at device search response reception unit 130 (YES at step S105), device search analyzer unit 131 executes a search response reception process that is a process on device search response data (step S107). This search response reception process of step S107 will be described afterwards.

In the case where the device search response data receivable mode is canceled, or when a predetermined period of time has elapsed from the transfer to a device search response data receivable mode with no reception of device search response data, the present process is terminated without executing the subsequent process.

On the basis of the processing result of step S107, selection is made of the software directed to updating to be transmitted to the client side device that has transmitted the device search response data (or another relevant client side device) through device search response analyzer unit 131 (step S109). Whether that software is to be transmitted or not is determined based on the processing result.

When determination is made that transmission of the software is appropriate (YES at step S111), the software is transmitted from software transmission unit 142 (step S113). When determination is made that transmission of the software is not appropriate (NO at step S111), the transmission process of step S113 is skipped, and the present process ends.

Figure 7:
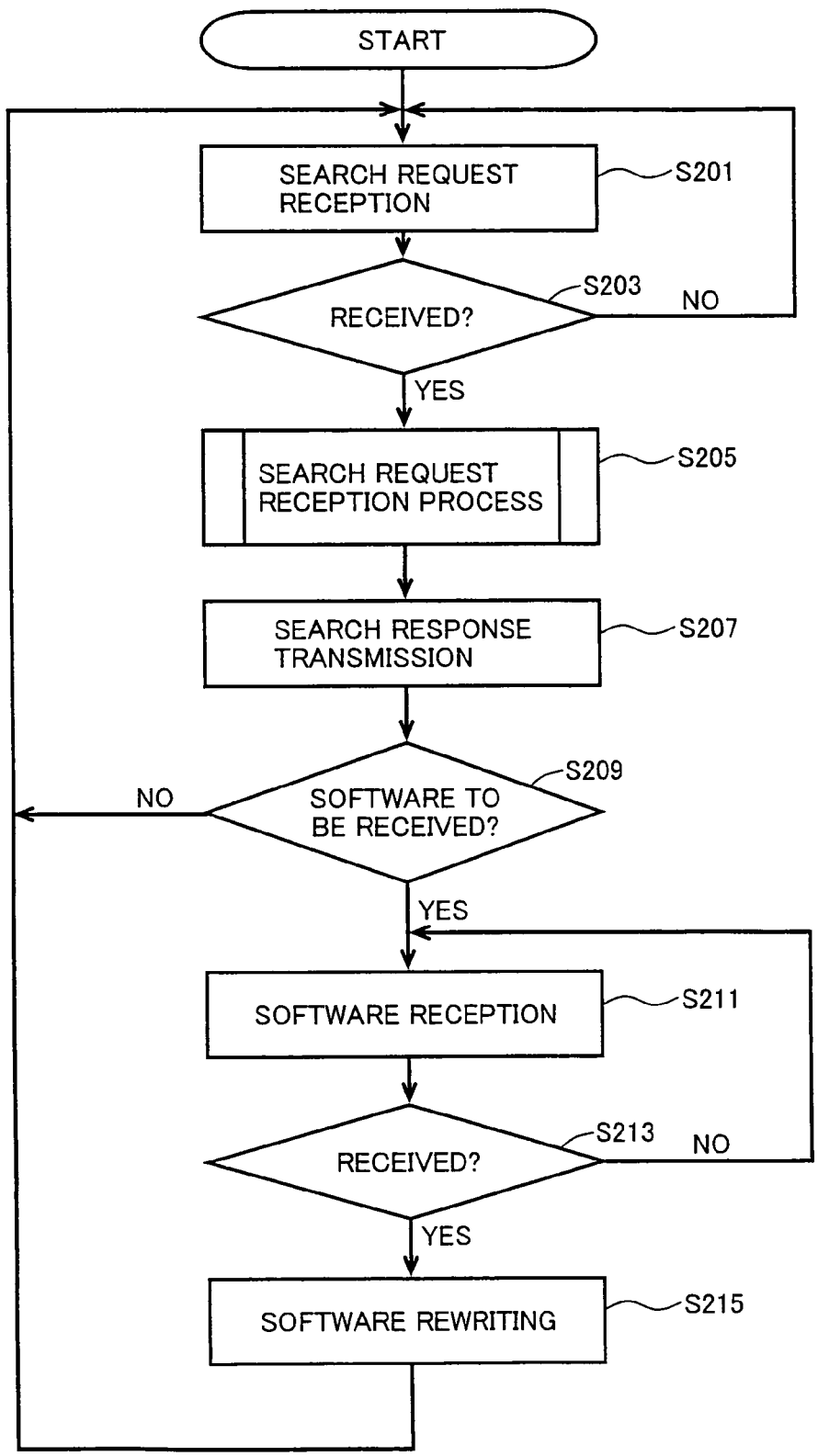
FIG. 7 is a flow chart of a software administration process at the client side device.

Assuming that device 11 identified as a personal computer is a client side device, the process according to the flow chart of FIG. 7 is implemented by CPU 601 of device 11 executing the software administration program stored in a memory unit such as ROM 619 to exhibit respective facilities of FIG. 4.

Referring to FIG. 7, device 11 enters a receivable mode of device search data transmitted from a server side device (step S201). When device search data is received from the server side device at device search request reception unit 220 (YES at step S203), search request reception process that is the process to generate device search response data based on the received device search data is executed at device response generation unit 221 (step S205).

The search request reception process of step S205 corresponds to the flow chart of FIG. 8.

Referring to FIG. 8, the received device search data is analyzed at device response generation unit 221 (step S301). Information identifying device 11, the status of device 11, information related to software stored in software storage unit 240 and the like are obtained (step S303). Then, device search response data is generated based on the obtained information (step S305).

At step S305, device search response data may be newly generated based on the obtained information. Alternatively, device search response data may be generated by rewriting appropriate sites in the received device search data.

Device search response data generated by the process set forth above at step S205 is transmitted to the server side device from device search response transmission unit 222 (step S207).

In the case where "condition of receiving software" is included as the information related to the software in the device search response data, i.e. in the case where the relevant client side device is permitted to receive and update software from the server side device (YES at step S209), waiting is conducted for reception of software (step S211).

In contrast, when "condition of not receiving software" is included as the information related to software in the device search response data, i.e. when the relevant client side device is not permitted to receive and update software from the server side device (NO at step S209), control returns to the device search data receivable mode of step S201 to wait for reception of device search data.

Upon receiving software for update from the server side device at software reception unit 250 (YES at step S213), software rewrite unit 251 rewrites the software stored in software storage unit 240 with the received software for update (step S215).

Thus, the series of processes ends, and control returns to the initial device search data receivable mode to wait for reception of device search data.

Referring to FIG. 9, the device search data and device search response data have a data configuration including data ("request/response" item) indicating whether data is device search data or device search response data, device status data ("status" item) indicating succession or failure of search, disallowed software updating, or required inquiry, "model designation" item, data ("printer" to "facsimile" items) representing information identifying a client side device, whether search is required for software executed by respective processing units at client side device, or information identifying a client side device for each software (revision information and the like), and data ("inquiry destination" item) representing the inquiry destination required at the time of software updating.

The example of the device search data shown in FIG. 10 corresponds to the data transmitted from the server side device at step S101 set forth above and received at a client side device at step S203 set forth above. In the example of FIG. 10, the server side device requests the client side device to search for the model designation, the software of an application (printer) for printing at the MFP, software of an application (scanner) to scan at the MFP, software of an application (panel) for screen display at the panel of the MFP, software of a program (controller) to control the MFP, and software of an application for facsimile transmission at the MFP (facsimile). It is appreciated from FIG. 10 that "1" representing request is indicated in the field of data ("model designation" to "facsimile" items) corresponding to information identifying a client side device as well as data representing whether a search is required or not for software executed by respective processing units at the client side server.

The example of the device search response data shown in FIG. 11 corresponds to data transmitted from a client side device at step S207 set forth above, and received at the server side device at step S105 set forth above. In the example of FIG. 11, the client side device sends a response to the server side device, including the model designation of the client side device and information to identify the software of an application (printer) for printing at the MFP, software of an application (scanner) for scanning at the MFP, software of an application (panel) for screen display at the panel of MFP, software of a program (controller) for MFP control, the software of an application (facsimile) for facsimile transmission at the MFP (designation, revision information, and the like), all requested in the server search data of FIG. 10. Further, the inquiry destination required in updating the software is specified.

Figure 12:
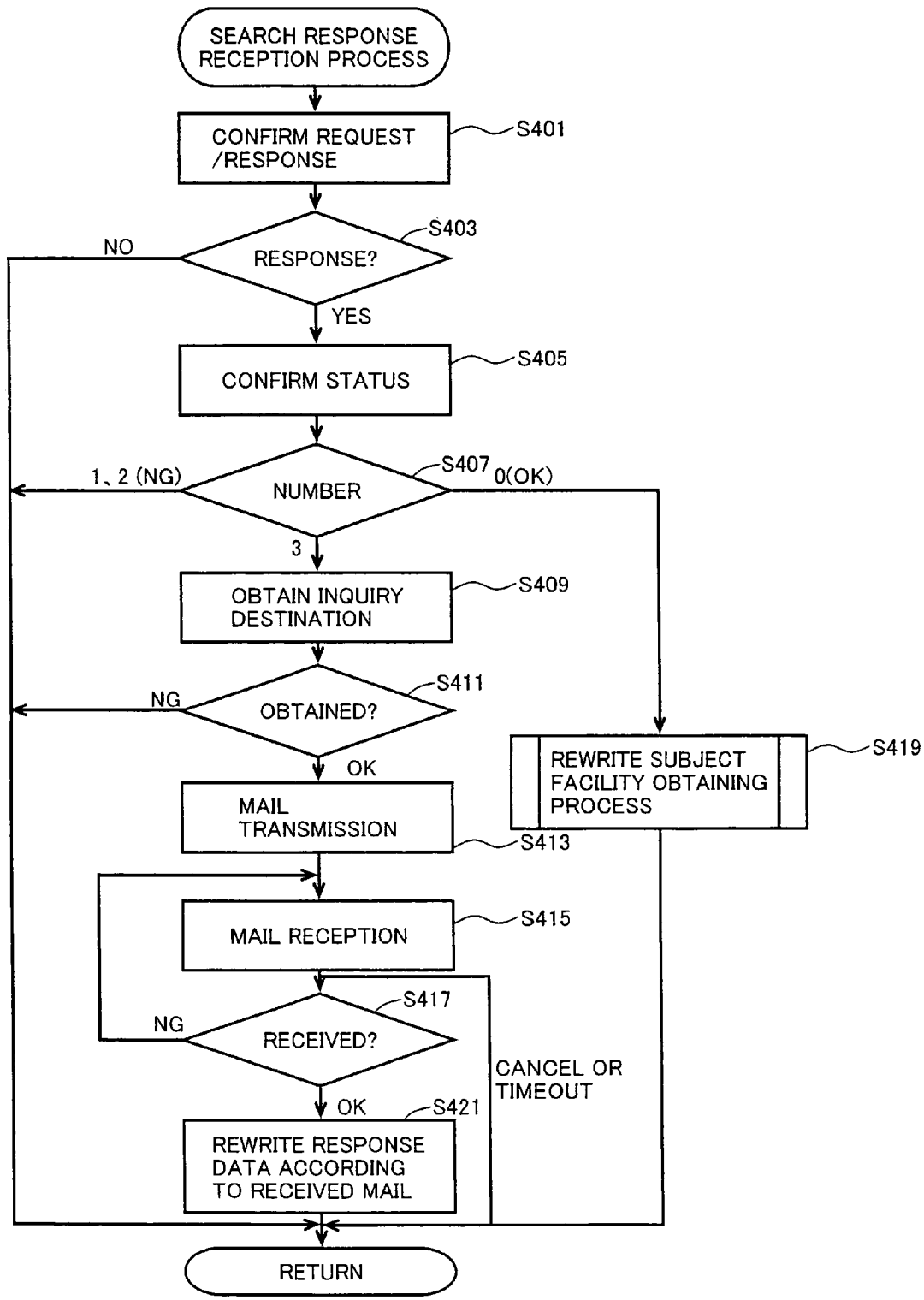
FIG. 12 is a flow chart of a search response reception process of step S107.

The search response reception process corresponding to the flow chart of FIG. 12 is executed at device search analyzer unit 131 of the server side device at step S107 set forth above. As a specific example, it is assumed that the device search response data of FIG. 11 is received from the client side device according to the device search data of FIG. 10.

Referring to FIG. 12, the data of "request/response" item among the device search response data is confirmed. It is identified that the data received from the client side device is device search response data (step S401). When the received data is not device search response data, i.e. when the data of "request/response" item is not "1" indicating a response (NO at step S403), the present process ends.

When the received data is device search response data, i.e. when the data of "request/response" item is "1" indicating a response (YES at step S403), the client side device status is confirmed. Specifically, succession or failure of search, disallowed software updating, or required inquiry are identified (step S405). The subsequent process branches according to the status (step S407).

When the data of "status" item represents "1" and "2" shown in FIG. 9, i.e. when the search has failed or software updating is not permitted ("1, 2 (NG)" at step S407), the present process ends.

When the data of "status" item represents "3" shown in FIG. 9, i.e. when inquiry is required in updating software ("3" at step S407), information related to the inquiry destination (access information) is obtained from the data of "inquiry destination" item among the device search response data (step S409). When the contents of "inquiry destination" item does not correspond to access information, and the inquiry destination could not be obtained (NG at step S411), the present process ends.

Upon obtaining information related to the inquiry destination from the data of "inquiry destination" item (OK at step S411), device search response analyzer unit 131 request an access unit not shown to gain access to a predetermined device based on the access information (step S413), and makes an inquiry on software updating. Then, control enters a waiting mode for a response to the inquiry (step S415).

The aforementioned access to a predetermined device is conducted by transmitting mail to the predetermined device. In this case, mail data as shown in FIG. 13 is prestored in a predetermined region in memory unit 20 as a mail format. At step S413, device search response analyzer unit 131 reads out information according to the device search response data received from a client side device and the parameter of a mail format from the storage unit at the server side device and/or software storage unit 140 to generate mail data for inquiry. Specifically as shown in FIG. 13, a mail format includes information such as access information of the server side device ($$$01$$), access information of the predetermined device relevant to the data of "inquiry destination" item ($$$02$$$), server side device identification information ($$03$$), client side device identification information ($$04$$) corresponding to the data of "model designation" item, revision information (former version number) identifying each software in a client side device corresponding to the data of "printer" to "facsimile" items, revision information (new version number) identifying software required to be updated at the client side device and stored in software storage unit 140 of the server side device, and access information to a site directed to updating each software in the client side device. At step S413, device search response analyzer unit 131 reads out the required information from the device search response data received from a client side device, from the storage unit of the server side device, and from software storage unit 140, and then fills the required items to generate the mail data shown in FIG. 14.

The administrator of the client side device receives mail based on the mail data of FIG. 14 at the predetermined device and gains access to the aforementioned site, whereby updating of software of a client side device is permitted by the predetermined device.

Figure 15:
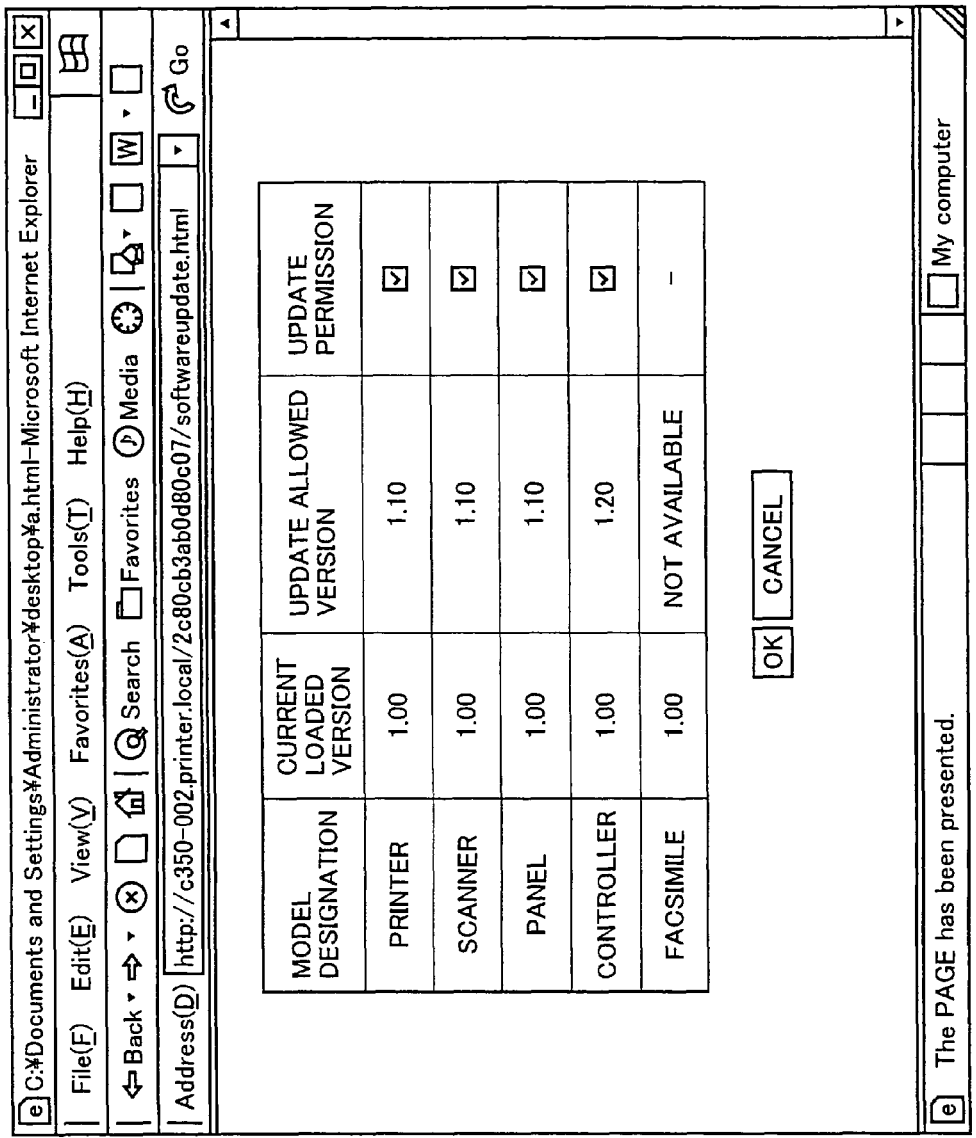
FIG. 15 shows a specific example of a site to update software of the client side device.

The site shown in FIG. 15 is stored at the server side device, a predetermined device on a network, or a predetermined device that is accessed via the Internet, and can be accessed based on the access information set forth above. In the case where such a site is a WEB page on the incorporated WEB server of the server side device (indicated as WEB servers 160 and 260 in FIG. 4), the access information corresponds to URL (Uniform Resource Locators) link information to access the relevant WEB page.

The site set forth above such as a WEB page and access information to such a site are generated dynamically according to device search response data based on the format of the mail data shown in FIG. 13. Such a site is preferably disclosed in a time-limited manner assigned with an expiration date to reject any software update requests by an improper access. It is further preferable that updating fails when software updating is requested through access gained improperly.

In the site shown in FIG. 15, permission of software updating at a client side device is assigned by the administrator. Permission of software updating is transmitted from the site set forth above to the server side device as a response to the inquiry set forth above.

Permission of software updating transmitted as an inquiry response is received at an access unit not shown of the server side device (YES at step S417). A process in accordance with the response is executed at device search response analyzer unit 131 (step S421).

The process in accordance with the response specifically corresponds to a rewriting process of the device search response data received at device search response analyzer unit 131 from a client side device based on permission of software updating assigned at the site set forth above. In response to execution of this process, a search response process is executed again. At step S407, it is confirmed that the data of "status" item in the device search response data is "0", and a process according to the contents is executed subsequently.

When the data of "status" item in the device search response data received from a client side device represents "0" shown in FIG. 9, i.e. when the client side search succeeds and software allowed to be updated is identified ("0" at step S407), a rewrite subject facility obtaining process that is the process of obtaining the software to be updated is executed at device search response analyzer unit 131 (step S419).

Figure 16:
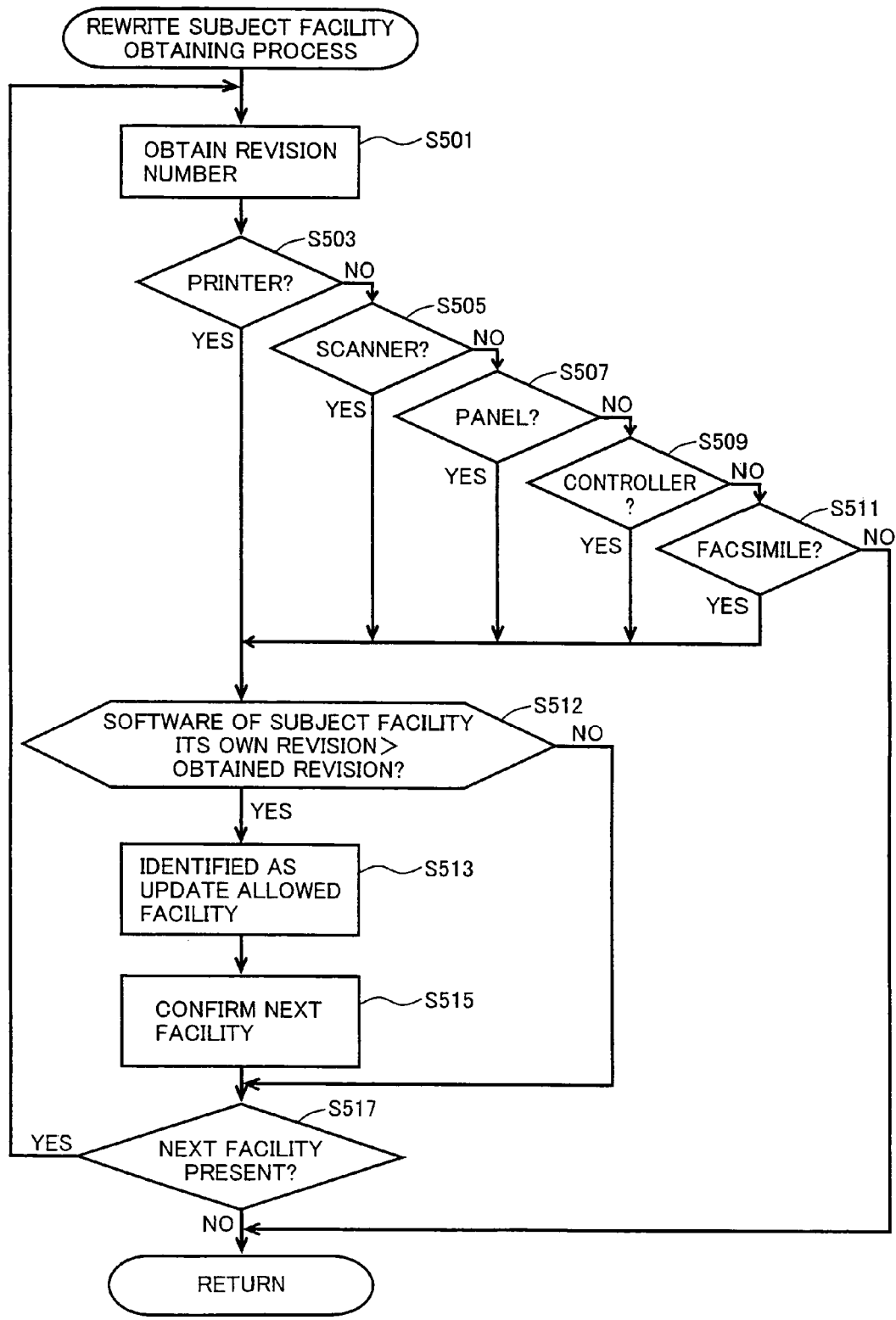
FIG. 16 is a flow chart of a rewrite subject facility obtaining process of step S419.

The rewrite subject facility obtaining process of step S419 is represented by the flow chart of FIG. 16.

Referring to FIG. 16, device search response analyzer unit 131 obtains revision information indicating the revision of software stored in its own software storage unit 140 (step S501). Each of the facilities (steps S503-S511) is compared with the revision of the software at the client side device analyzed based on the device search response data to determine whether updating is required or not (step S512). Since the software revision number becomes higher as the version of software is upgraded, determination is made that updating is required when the revision number of software at the server side device becomes larger than the revision number of software at the client side device.

In the present embodiment, one of the facilities shown in the data search response data (for example, printer) has the revision information compared (step S512). When determination is made that updating is required (YES at step 503), control proceeds to the step of confirming that the facility has software updating allowed (step S513), and is identified as the subject of updating.

Further, the next facility in the device search response data is confirmed (step S515). When there is a facility (for example, scanner) subsequent to the facility set forth above (YES at step S517), control returns to step S501 to repeat the process. Each facility in the device search response data is sequentially subjected to determination of whether updating is required or not (steps S503-511), and appropriately identified as the subject of updating.

In accordance with a device executing the process set forth above in the system of the present embodiment, software can be updated automatically to the newest version without the presence of an administrator or the like.

Furthermore, since software can be updated as necessary, as a result of automatic inquiry in addition to revision information, determination of whether software updating is required/allowed or not can be made in a flexible manner.

The system of the present embodiment does not have the server facility in devices 10-1n permanently settled, and a device among the devices on the network sequentially becomes the server side device for a predetermined period of time at a predetermined timing. Specifically, the devices in the system of the present embodiment have selective roles as the server side device and client side device.

Figure 17:
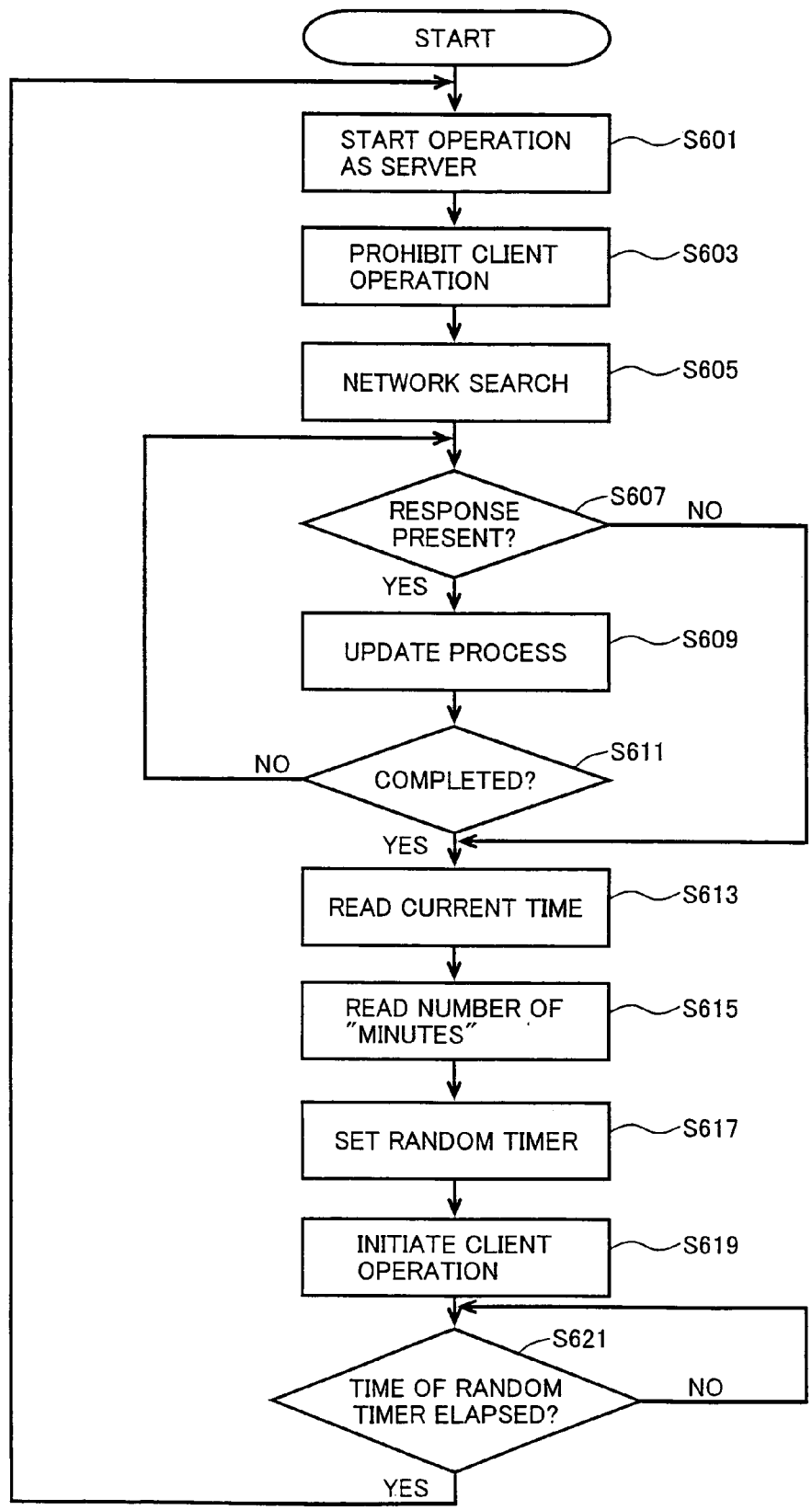
FIG. 17 is a flow chart of a process to switch between the server facility and client facility in one device.

Assuming that device 10 identified as an MFP is the server side device, the process corresponding to the flow chart of FIG. 17 is implemented by CPU 21 of device 10 executing a program directed to exhibiting the server facility stored in memory unit 20 to exhibit respective facilities shown in FIG. 4.

Referring to FIG. 17, the present process is initiated at the starting timing in the present system such as the timing of power-on. CPU 21 renders active each of units 110, 111, 130, 131, 140, 141, and 142 included in the server unit, whereby an operation as a server is initiated (step S601). At the same time, CPU 21 renders inactive each of units 120, 121, 122, 150 and 151 included in the client unit to prohibit an operation as a client device (step S603).

Then, device 10 transmit the device search data as the server side device to execute the process set forth above to search for a client side device already present on the network (step S607). In response to the device search response data received as a response thereof (YES at step S607), the process of updating the software is executed (step S609).

When there is no response from a client side device on the network (NO at step S607), or when the process of updating software is completed according to all the responses from client side devices present on the network (YES at step S611), the current time is read out (step S603). The current number of "minutes" is set at the random timer (step S617). CPU 21 renders active each of units 120, 121, 122, 150, and 151 in the client unit, and an operation as a client device is initiated (step S619).

This operation as a client device continues until a random time has elapsed, which is detected by the random timer set at step S617 (NO at step S621). At the elapse of the random time, control returns to step S601. CPU 21 renders active each of units 110, 111, 130, 131, 140, 141, and 142 in the server unit, and an operation as the server is initiated.

By execution of the process set forth above at the device of the present embodiment, the server facility and client facility are switched within one device at the starting time or at an elapse of a random time. This facility switching at an elapse of a random time is advantageous in that there will be no plural server side devices on the network at the same time, eliminating the possibility of duplicated operation. Thus, the server facility is dynamically switched on the network in the system of the present embodiment, and the server side device is not permanently settled on the network.

Since the server side device changes on the network as described above, it is no longer necessary to always set the software of one predetermined device at the newest revision even in a configuration where the process of updating the software of a client side device relevant to a lower level is conducted in relation to the server device relevant to an upper level. It is now possible to automatically achieve the newest revision as the entire network if there is software of the newest revision in any of the devices on the network.

The above embodiment was described in which one device has a server facility and a client facility, and the server side device is allocated dynamically in the system. It is needless to say that a device exhibiting only the server facility may be provided in the system, permanently functioning as the server side device. In other words, the device of the present embodiment may include only the server unit in device 10 among the facility configuration directed to software administration on a network, and execute only the process of FIG. 6, dispensed with the process of FIG. 7.

Further, the software updating method executed in the above-described system can be provided as a program. Such a program can be recorded in a computer-readable recording medium such as a flexible disk, CD-ROM, ROM, RAM, or memory card in association with the computer to be provided as a program product. Alternatively, the program can be provided in the format of being recorded in a recording medium such as a hard disk incorporated in a computer. Additionally, the program can be downloaded via a network.

The provided program product is installed in a program storage unit such as a hard disk to be executed. The program product includes the program per se, and a recording medium in which the program is recorded.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
a software storage unit storing software,
a search unit searching for another apparatus on a network,
a response reception unit receiving a first response to said search from said another apparatus searched by said search unit, wherein said first response includes first access information related to an inquiry destination not corresponding to said image processing apparatus nor said another apparatus,
a response analyzer unit obtaining said first access information from said first response, making an inquiry of software updating to said inquiry destination, receiving a second response to said inquiry of software updating, and determining whether updating of software stored in said software storage unit of said another apparatus is required or not based on permission of software updating included in said second response, and
a software transmission unit reading out software required to be updated from said software storage unit of said image processing apparatus, and transmitting said software read out to said another apparatus.

2. The image processing apparatus according to claim 1, wherein
said first response includes revision information of said software stored in said software storage unit of said another apparatus, and
said response analyzer unit determines whether said updating is required or not based on revision of said software stored in said software storage unit of said another apparatus and revision of said software stored in said software storage unit of said image processing apparatus.

3. The image processing apparatus according to claim 1, wherein
said response analyzer unit generates second access information for a site directed to conducting said updating, and a notification of said second access information is sent to said inquiry destination.

4. The image processing apparatus according to claim 3, wherein
said notification is a notification sent through electronic mail, and said response analyzer unit generates mail data using a predetermined format and information included in said first response.

5. The image processing apparatus according to claim 1, wherein said response generation unit obtains status information including information related to software stored in said software storage unit to generate said first response including said status information.

6. The image processing apparatus according to claim 1, further comprising a facility switch unit switching the facility to be rendered active between a server facility including said search unit, said response reception unit, said response analyzer unit, and said software transmission unit, and a client facility including said response generation unit, said response transmission unit, said software reception unit and said rewrite unit.

7. The image processing apparatus according to claim 1, wherein said search unit executes said search in response to said image processing apparatus being powered on.

8. The image processing apparatus according to claim 1, wherein
said software storage unit stores a plurality of software, and
said response analyzer unit determines whether said updating is required or not for each said software stored in said software storage unit.

9. A software updating method executed by an image processing apparatus including a software storage unit storing software, said method comprising:
a search step of searching for another apparatus on a network,
a response reception step, executed by the image processing apparatus, of receiving a first response to said search from said another apparatus that is searched in said search step, wherein said first response includes first access information related to an inquiry destination not corresponding to said image processing apparatus nor said another apparatus,
a response analyzing step, executed by the image processing apparatus, of obtaining said first access information from said first response, making an inquiry of software updating to said inquiry destination, and receiving a second response to said inquiry of software updating, and determining whether updating of software stored in said software storage unit of said another apparatus is required or not based on permission of software updating including in said second response, and
a software transmission step of reading out software required to be updated from said software storage unit of said image processing apparatus, and transmitting said software read out to said another apparatus.

10. The software updating method executed by an image processing apparatus according to claim 9, wherein
said first response includes revision information of said software stored in said software storage unit of said another apparatus, and
said response analyzing step includes the step of determining whether said updating is required or not based on revision of said software stored in said software storage unit of said another apparatus and revision of said software stored in said software storage unit of said image processing apparatus.

11. The software updating method executed by an image processing apparatus according to claim 9, further including a response generation step of generating a response to a search from another apparatus on said network and includes the step of obtaining status information including information related to software stored in said software storage unit of said image processing apparatus to generate said first response including said status information.

12. The software updating method executed by an image processing apparatus according to claim 9, further comprising a facility switching step, executed by the image processing apparatus, of switching the step of execution between a server side step including said search step, said response reception step, said response analyzing step, and said software transmission step, and a client side step including said response generation step, said response transmission step, said software reception step, and said rewrite step.

13. The software updating method executed by an image processing apparatus according to claim 9, wherein said search step includes the step of executing, by the image processing apparatus, said search in response to said image processing apparatus being powered on.

14. The software updating method executed by an image processing apparatus according to claim 9, wherein
said software storage unit of said image processing apparatus stores a plurality of software, and
said response analyzing step includes the step of determining whether said updating is required or not for each said software stored in said software storage unit.

15. The software updating method executed by an image processing apparatus according to claim 9, wherein
said response analyzing step includes the step of generating second access information for a site directed to conducting said updating, and a notification of said second access information is sent to said inquiry destination.

16. The software updating method executed by an image processing apparatus according to claim 15, wherein said notification is a notification sent through electronic mail, and said response analyzing step includes the step of generating mail data using a predetermined format and information included in said first response.

* * * * *